US011423402B2

(12) United States Patent
Dykes

(10) Patent No.: US 11,423,402 B2
(45) Date of Patent: *Aug. 23, 2022

(54) TECHNIQUES FOR PROCESSING PIN-INCLUSIVE TRANSACTIONS IN CONNECTION WITH AN ELECTRONIC DEVICE

(71) Applicant: TouchTunes Music Corporation, New York, NY (US)

(72) Inventor: Robert R. Dykes, Los Altos Hills, CA (US)

(73) Assignee: TOUCHTUNES MUSIC CORPORATION, New York, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/926,969

(22) Filed: Jul. 13, 2020

(65) Prior Publication Data

US 2020/0342458 A1 Oct. 29, 2020

Related U.S. Application Data

(63) Continuation of application No. 14/481,761, filed on Sep. 9, 2014, now Pat. No. 10,719,829.

(60) Provisional application No. 61/875,195, filed on Sep. 9, 2013.

(51) Int. Cl.
*G06Q 20/38* (2012.01)
*G06Q 20/40* (2012.01)

(52) U.S. Cl.
CPC ..... *G06Q 20/4012* (2013.01); *G06Q 20/3823* (2013.01)

(58) Field of Classification Search
CPC .................................................. G06Q 20/4012
USPC ................................................ 705/67, 72, 75
See application file for complete search history.

(56) References Cited

U.S. PATENT DOCUMENTS

| 6,285,374 | B1 | 9/2001 | Falcon |
| 7,144,322 | B2 | 12/2006 | Gomez |
| 7,454,370 | B2 | 11/2008 | Baril |
| 7,778,879 | B2 | 8/2010 | Nathan et al. |
| 7,822,687 | B2 | 10/2010 | Brillon et al. |
| 7,987,282 | B2 | 7/2011 | Nathan et al. |
| 7,992,178 | B1 | 8/2011 | Nathan et al. |
| 7,996,438 | B2 | 8/2011 | Mastronardi et al. |
| 8,127,324 | B2 | 2/2012 | Nathan |
| 8,145,547 | B2 | 2/2012 | Nathan et al. |
| 8,165,318 | B2 | 4/2012 | Nathan et al. |

(Continued)

*Primary Examiner* — Chinedu C Agwumezie
(74) *Attorney, Agent, or Firm* — Nixon & Vanderhye, PC

(57) ABSTRACT

Certain exemplary embodiments relate to techniques for processing PIN-inclusive transactions in connection with an electronic device or terminal, e.g., where PIN code encryption keys are not necessarily stored on the electronic device or terminal, and/or where payment instrument data is maintained in a separate system from PIN code data at least until certain elements are combined in a highly secure system for submission to an electronic funds transfer network. One or more separate or physically separated systems may be used in this regard, e.g., taking advantage of more prevalent computer networks such as the Internet. Similarly, the ability to provide less expensive terminals or electronic devices at a point-of-sale, point-of-purchase, etc., may be advantageous. The interchange rate is not necessarily driven up in certain example instances.

20 Claims, 3 Drawing Sheets

(56) References Cited

U.S. PATENT DOCUMENTS

| | | |
|---|---|---|
| 8,184,508 B2 | 5/2012 | Nathan et al. |
| 8,214,874 B2 | 7/2012 | Nathan |
| 8,225,369 B2 | 7/2012 | Nathan et al. |
| 8,275,668 B2 | 9/2012 | Nathan et al. |
| 8,332,887 B2 | 12/2012 | Dion et al. |
| 8,428,273 B2 | 4/2013 | Nathan |
| 8,469,820 B2 | 6/2013 | Nathan et al. |
| 8,473,416 B2 | 6/2013 | Brillon et al. |
| 8,479,240 B2 | 7/2013 | Nathan et al. |
| 8,495,109 B2 | 7/2013 | Nathan et al. |
| 8,661,477 B2 | 2/2014 | Nathan et al. |
| 8,683,541 B2 | 3/2014 | Nathan et al. |
| 8,719,873 B2 | 5/2014 | Nathan et al. |
| 8,724,436 B2 | 5/2014 | Nathan et al. |
| 8,726,330 B2 | 5/2014 | Nathan et al. |
| 8,751,611 B2 | 6/2014 | Nathan et al. |
| 9,177,314 B2 * | 11/2015 | Uzo .................. G06Q 20/20 |
| 10,719,829 B2 * | 7/2020 | Dykes ............ G06Q 20/3823 |
| 2005/0237321 A1 | 10/2005 | Young et al. |
| 2007/0038727 A1 | 2/2007 | Bailey et al. |
| 2008/0243624 A1 | 10/2008 | Perry et al. |
| 2010/0138780 A1 | 6/2010 | Marano |
| 2010/0153726 A1 * | 6/2010 | Liu ........................ H04L 9/083 713/168 |
| 2010/0299436 A1 | 11/2010 | Khalid |
| 2011/0191194 A1 | 8/2011 | Lutnick et al. |
| 2012/0254791 A1 | 10/2012 | Jackson |
| 2012/0284196 A1 * | 11/2012 | Vilmos ............. G06Q 20/3265 705/44 |
| 2013/0067512 A1 | 3/2013 | Dion et al. |
| 2014/0089183 A1 * | 3/2014 | Allen ................. G06Q 20/409 705/41 |
| 2014/0114775 A1 | 4/2014 | Cloin |
| 2015/0128076 A1 | 5/2015 | Fang et al. |
| 2015/0134542 A1 | 5/2015 | Dykes |
| 2015/0278926 A1 | 10/2015 | Fang et al. |
| 2016/0078434 A1 * | 3/2016 | Huxham ............ G06Q 20/3829 705/71 |

\* cited by examiner

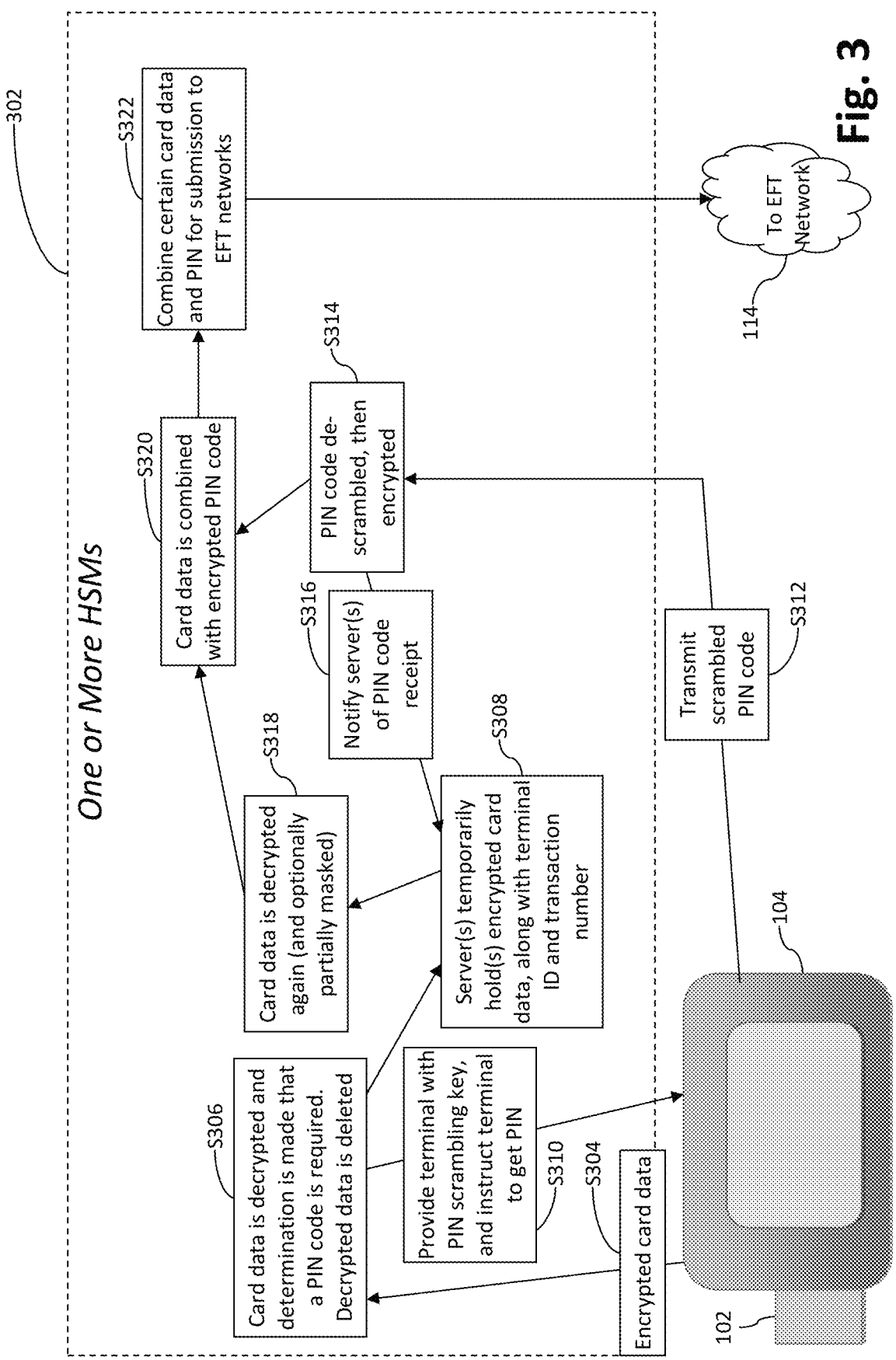

TECHNIQUES FOR PROCESSING PIN-INCLUSIVE TRANSACTIONS IN CONNECTION WITH AN ELECTRONIC DEVICE

CROSS-REFERENCE TO RELATED APPLICATION

This application is a continuation of U.S. patent application Ser. No. 14/481,761 filed Sep. 9, 2014 which claims the benefit of U.S. Application Ser. No. 61/875,195, filed on Sep. 9, 2013, the entire contents of which is hereby incorporated herein by reference.

TECHNICAL FIELD

Certain exemplary embodiments relate to techniques for processing PIN-inclusive transactions in connection with an electronic device or terminal.

BACKGROUND AND SUMMARY

PIN-related debit transactions currently are processed at merchants' locations in very secure terminals provided by companies such as VeriFone. In general, a terminal accepts a PIN code entered by a user and encrypts it, and then sends the encrypted data through a merchant's payment system. These terminals are designed to be highly secure, e.g., while operating without any connection to the terminal manufacturer.

Although the Internet has become widely available to merchants, and although many of these terminals are connected to the Internet, they nonetheless still provide complete security for PIN code encryption keys within the terminal itself. In order to process PIN codes associated with certain types of payment cards, keys are installed in the terminal in a highly secure manner, e.g., such that tampering can be detected and, upon detection of tampering, encryption keys can be voided.

The bias toward storing PIN code encryption keys on terminals, and the concomitant use of anti-tampering mechanisms, unfortunately drives up terminal costs. Similarly, the bias away from using public, widely-available networks like the Internet can impede widespread adoption of payment means capable of accepting PIN-related debit transactions.

Thus, it will be appreciated that it would be desirable to overcome these and/or other disadvantages. For instance, it will be appreciated that it would be desirable to provide secure mechanisms for processing PIN-related debit and/or other transactions, e.g., that obviate the need to "permanently" store encryption keys on terminals, make use of networks to which merchants are already connected, facilitate payment processing from an increased merchant base, and/or the like.

Certain exemplary embodiments relate to techniques of accepting PIN codes, without having encryption keys "permanently" stored on the terminal, while still complying with relevant payment industry standards. In some scenarios, this approach advantageously helps avoid the need to secure such keys on the terminal and in turn may help to reduce the cost of the terminal, while still complying with relevant payment industry standards. The ability to obviate the need to store encryption keys on the terminal also may advantageously enable transactions to be performed in connection with a potentially broader array of device types.

Payment industry standards currently specify that the data contained in the magnetic stripe of a card (referred to herein as the "track data") cannot be present with the unencrypted PIN code in any but a highly-secured system. Certain exemplary embodiments therefore provide techniques that help ensure that such track data is always in a separate system from the PIN code data, at least until certain elements are combined in a highly secure system for submission to the electronic funds transfer (EFT) Network.

In certain exemplary embodiments, a system for securely processing payments is provided. The system including first and second separate and/or physically separated computer systems, with each of the first and second computer systems being configured to electronically communicate with an electronic device used in processing a PIN-related debit transaction, and with the transaction having an associated transaction identifier and the electronic device having an associated device identifier. The first computer system comprises at least one first computer processor and is configured to at least: receive encrypted payment instrument information from the electronic device for the transaction; decrypt the received encrypted payment instrument information; electronically transmit to the second computer system the decrypted payment instrument information, the identifier of the electronic device, and the transaction identifier; and electronically instruct the electronic device to request a PIN scrambling key from the second computer system. The second computer system comprises at least one second computer processor and is configured to at least: generate for and transmit to the electronic device a PIN scrambling key in response to a request being received at the second computer system from the electronic device; receive a scrambled PIN code from the electronic device, with the scrambled PIN code being scrambled at the electronic device using the generated PIN scrambling key; descramble and encrypt the received scrambled PIN code; and electronically transmit to an electronic fund transfer network the payment instrument information received from the first computer system and the descrambled and encrypted PIN code to securely process the PIN-related debit transaction.

In certain exemplary embodiments, a hardware security module comprising at least one processor and a memory is provided. The at least one processor and memory are arranged to cooperate to perform operations comprising: receiving encrypted payment instrument information; decrypting the received encrypted payment instrument information; determining, from the decrypted payment instrument information, that a PIN code is required. In response to the determination that a PIN code is required, the hardware security module is further configured to perform operations comprising: deleting the decrypted payment instrument information; generating for and providing to the electronic terminal a PIN scrambling key; transmitting to the electronic terminal an instruction to obtain a PIN code; temporarily holding an encrypted version of at least some of the received payment instrument information; receiving from the electronic terminal the PIN code, scrambled using the PIN scrambling key; descrambling the received scrambled PIN code; encrypting the descrambled PIN code; decrypting the temporarily held encrypted version of the at least partial payment instrument information; and electronically transmitting to an electronic fund transfer network the at least partial payment instrument information and the descrambled and encrypted PIN code to securely process the PIN-related debit transaction.

Corresponding methods and/or non-transitory computer readable storage media also are contemplated herein.

The exemplary embodiments, aspects, and advantages disclosed herein may be provided in any suitable combination or sub-combination to achieve yet further exemplary embodiments.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 3 illustrates how a combined system approach for PIN-based debit card processing may be used in accordance with certain exemplary embodiments.

DETAILED DESCRIPTION

Certain exemplary embodiments relate to techniques for processing PIN-inclusive transactions in connection with an electronic device or terminal, e.g., where PIN code encryption keys are not necessarily stored on the electronic device or terminal, and/or where track data is maintained in a separate system from PIN code data at least until certain elements are combined in a highly secure system for submission to the electronic funds transfer (EFT) network.

Figure 1:
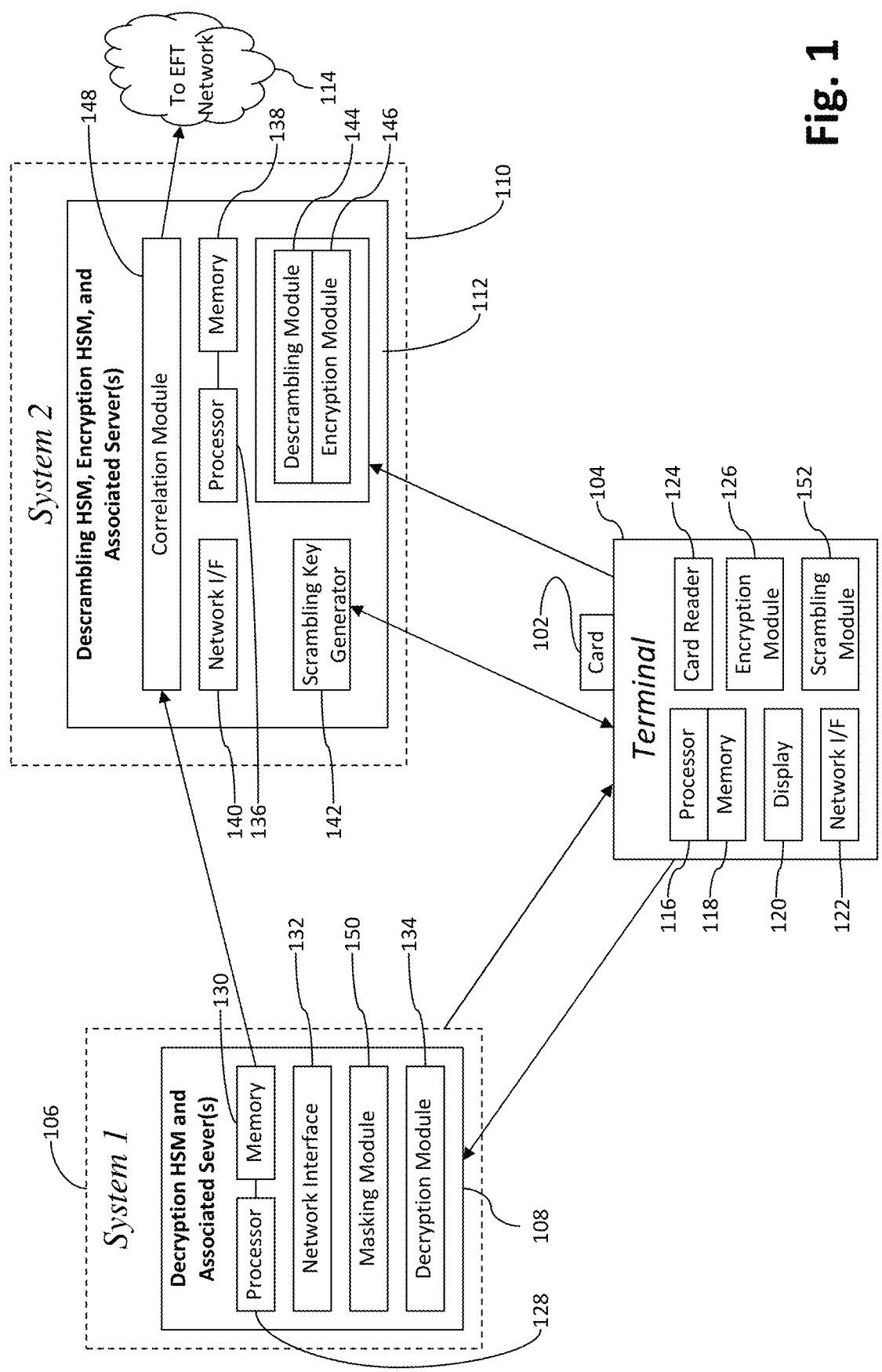
FIG. 1 is a schematic view of a two-system approach for PIN-based debit card processing in accordance with certain exemplary embodiments.
Figure 2:
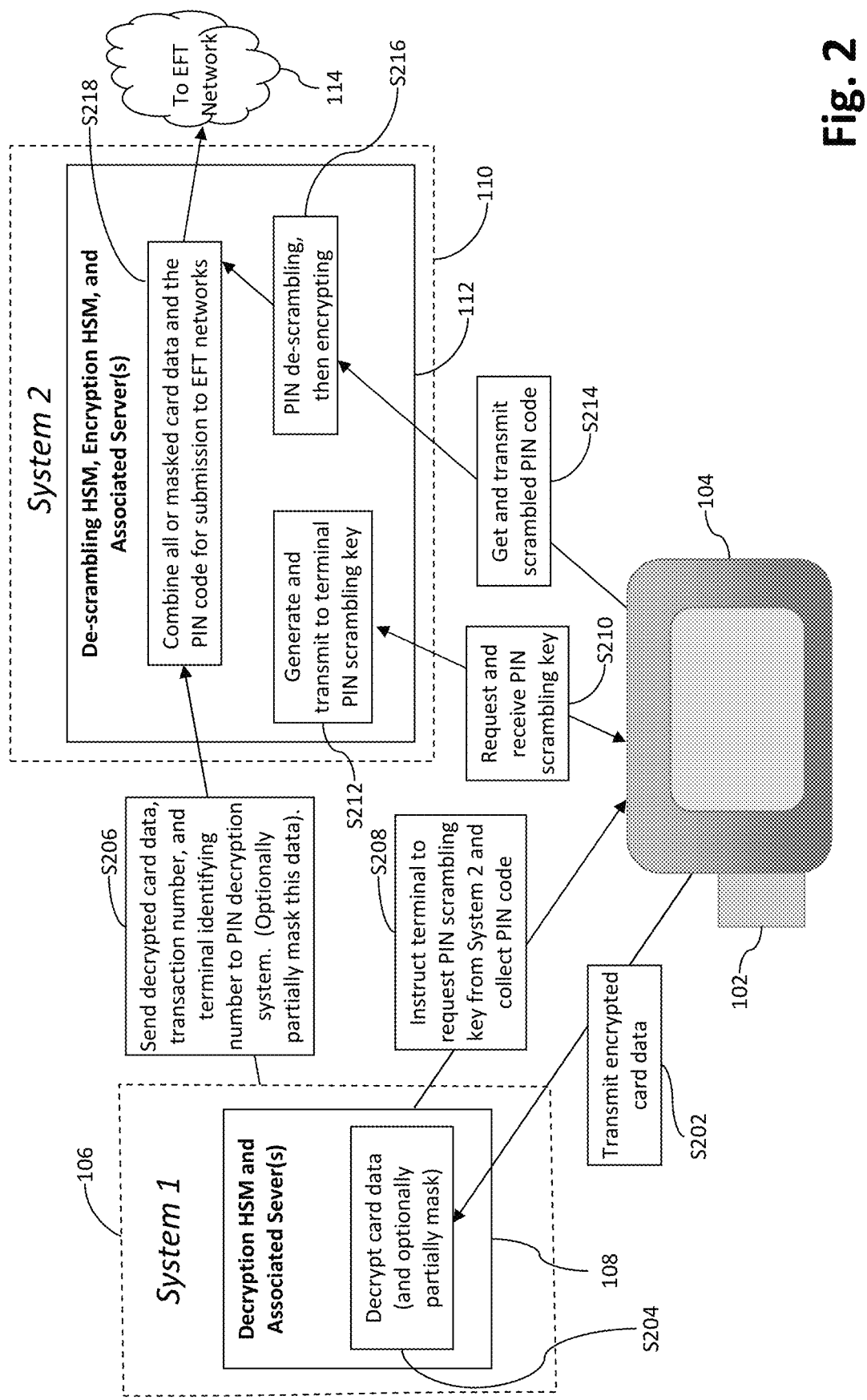
FIG. 2 illustrates how the FIG. 1 example approach may be used in accordance with certain exemplary embodiments.

FIG. 1 is a schematic view of a two-system approach for PIN-based debit card processing in accordance with certain exemplary embodiments, and FIG. 2 illustrates how the FIG. 1 example approach may be used in accordance with certain exemplary embodiments. In this regard, FIG. 1 shows a card 102 being read by a terminal 104. The PIN-inclusive transaction is processed in connection with a first system 106 (and its related decryption hardware security module server(s) 108), and a second system 110 (and its associated descrambling and encryption hardware security module server(s) 112) prior to being submitted to the EFT network 114.

The terminal 102 is an electronic device that includes a processor 116, a memory 118, a display 120, and a network interface 122. In certain exemplary embodiments, the terminal 102 may display routing network logos and/or the like, e.g., via its display 120. Certain exemplary embodiments may be used with a magnetic strip containing track and/or other card data. When a card 102 has its data read by the terminal 104, e.g., as a result of being swiped through a magnetic stripe reader, a near-field communication (NFC) signal being read, etc., via the card reader 124, the data is immediately encrypted via the terminal's encryption module 126 (which operates in connection with the processor 116). Any suitable encryption technique may be used but, in certain exemplary instances, it may desirable to use a public/private key (PPK) encryption technique in the magnetic reading head in connection with, for example, encrypting magnetic read heads provided by Magtek or IDTech. The encryption therefore may take place before the read data is transmitted to the terminal's software or firmware. For instance, any temporarily persisted data may be encrypted in certain exemplary embodiments.

In step S202, the terminal may transmit the encrypted data, without altering it, e.g., using the network interface 122. The same transmission may also include information that identifies the terminal 104 (such as, for example, its MAC address, IP address, and/or other hardware identifying information) and a transaction number. The transmission may take place over the Internet or other suitable network, and the transmission may be sent to a highly secure hardware security module (HSM) server 108 (which may be referred to as the Card Data HSM or "CDHSM") in the first system 106 in FIGS. 1-2.

Immediately upon transmission, the terminal 104 erases all card data from its memory 118. The CDHSM server 108 also includes at least one processor 128, a memory 130, and a network interface 132 over which data may be sent/received. The at least one processor 128 cooperates with a decryption module 134 to decrypt the data received from the terminal 104 in step S204. The at least one processor 128 of the CDHSM server 108 also determines that the card 102 is a debit card requiring a PIN code to be entered. The determination may be made via a table lookup process that is regularly used in the payment industry, or any other suitable technique. For example, a Check-PIN web service may be called to facilitate such a determination. The data, including the information that identifies the terminal 104 and transaction number, is passed to a separate secure system shown as System 2 or second system 110 in FIGS. 1-2. This procedure also is represented in step S206. These systems 106 and 110 may be separated in any suitable way. For instance, the first and second systems 106 and 110 may be located at different companies behind different firewalls, at the same company behind separate firewalls, etc. A secure link may be setup to facilitate secure communications between the systems.

In embodiments where completely different systems are provided, the second system 110 (and its associated descrambling and encryption hardware security module server(s) 112 may include at least one processor 136 and a memory 138, along with a network interface 140.

The first system 106 also notifies the terminal 104 that a PIN entry is required, in step S208. Upon receiving notification that a PIN code is required, the terminal 104 communicates with the second system 110 using its network interface 122 and, more particularly, requests a PIN-scrambling key. The second system 110 may use its scrambling key generator 142 (which may operate in connection with the at least one processor 136 and memory 138 of the second system 110) in this regard, and the request and receipt of the PIN scrambling key is represented as step S210, and the generation and transmission of the PIN scrambling key at/by the second system 110 is represented by step S212. It is noted any suitable technique may be used to help ensure that the numbers entered via the terminal 104 are scrambled (e.g., using the scrambling module 152) such that the knowledge of what number was entered by the user is encrypted. See, for example, U.S. Pat. No. 8,251,286, the entire contents of which are hereby incorporated herein. In certain exemplary embodiments, because the card is swiped (or a chip or NFC data is read, etc.), the full card data may be known at least temporarily to the terminal 104, thereby facilitating the scrambling.

The scrambled data is transmitted from the terminal 104 to the second system 110 in step S214. At the second system 110, descrambling is performed to retrieve the originally entered PIN code. The second system 110 thus receives a communication from the terminal 104 with the transaction ID, and the second system 110 may verify the MAC address or other identifying information of the terminal 104 that was provided by the first system 106. After receiving and descrambling the PIN code in connection with the descrambling module 144, the now descrambled PIN code may be may be encrypted in the System 2's HSM 112 via the encryption module 146 in a manner that is conventional in the payment industry for such PIN code encryption. Pin descrambling and encrypting operations are represented by step S216. System 2 may then associate the encrypted PIN code with the card data provided to it by system 1 using its correlation module 148 in step S218, and pass the card data and encrypted PIN code data out to the appropriate EFT network entity that in the payment industry processes such PIN-debit data. The second system 110 may receive verification of acceptance of the card data from the EFT network 114 and verify acceptance of the card data, e.g., directly back to the terminal 104 and/or to the terminal 104 via the first system 106.

In certain exemplary embodiments, the functions of the three secure processing units may be combined into one, two, or any suitable number of secure processing units. In this regard, FIG. 3 illustrates how a combined system approach for PIN-based debit card processing may be used in accordance with certain exemplary embodiments. From an architectural standpoint, the combined system 302 shown in FIG. 3 may include some or all of the components discussed above in connection with FIGS. 1-2. For instance, the combined system 302 may include one or more HSMs that include at least one processor, memory, a network interface, a scrambling key generator, scrambling/de-scrambling modules, encryption/decryption modules, a correlation module, and/or the like. The operation of these example components will become apparent from the following description.

Similar to above, encrypted card data is sent from the terminal 104 to the Combined Secure System (CSS) 302. When the CSS 302 decrypts the card data and determines that a PIN code entry is required, it may delete the unencrypted card data that was used to make that determination, as indicated in step S306. It may, however, take note of the transaction number and the terminal identifying data, and hold this information temporarily, along with the encrypted card data, as indicated in step S308. This may be accomplished by storing such information to a transitory or non-transitory computer readable storage medium or the like. The CSS 302 may then issue a temporary key to software in the terminal 104, along with instructions indicating that a PIN code is required, as indicated in step S310. As above, any suitable technique may be used in connection with the scrambling of numbers on the screen of the terminal 104. Transmission of the scrambled PIN code may, however, be made to the CSS 302 in step S312, and descrambling may be performed at the CSS to retrieve the entered PIN code. The CSS 302 encrypts the PIN code in a manner that is conventional in the payment industry for such PIN encryption. The descrambling and encryption is represented in step S314. The CSS 302 returns the encrypted PIN number along with the transaction ID and the terminal identifier in step S316. The associated server uses these identifiers to find the encrypted card data it has stored, and sends the encrypted card data to the CSS to decrypt the card data in step S318. It then associates the encrypted PIN code with the decrypted card data in step S320, and passes the card data and encrypted PIN code data to the appropriate EFT network entity in the payment industry that processes such PIN-related debit data in step S322. The system 302 may receives verification of acceptance of the card data by the EFT network and verify acceptance of the card data, directly or indirectly, back to the terminal 104.

In this manner, the CSS 302 and/or its associated servers may never have unencrypted card data and unencrypted a PIN code together.

It will be appreciated that in certain exemplary embodiments, the Secure Servers, including the CSS 302, may be provided in a cloud computing environment such as, for example, in a PCI-compliant version of Amazon AWS.

In other exemplary embodiments, when the first system 106 or the CSS 302 decrypts the card data, it may delete much of the data, e.g., leaving only the data that is normally known to a user and which is entered as if a user is performing, for example, an online transaction. Such masking of the data before transmitting to system 2 or the EFT networks may be performed in connection with the masking module 150 and may in certain instances help to improve security, because the full card data and encrypted PIN code are then never in the same system. Thus, for example, a hacker who gets into any one of the systems does not have sufficient data to manufacturer a full debit card that might be used at an ATM or the like.

Although one might in some case expect providing limited card data in the manner disclosed herein to drive up the interchange rate, this is not necessarily the case. Indeed, one might expect the exemplary techniques disclosed herein to be similar to a "card-not-present" transaction that incurs substantially higher interchange rates when credit cards are used. The inventor has realized, however, that the Durbin Bill mandates a fixed price interchange rate for debit cards that does not differentiate between "pin vs. no pin (signature)" events, let alone if all the card data was provided. Thus, certain exemplary embodiments at least a present will not necessarily have a higher interchange rate, even though incomplete data is provided. It is noted, however, that different rates may be provided in the future, given evolving understandings and implementations of the Durbin Bill, etc.

In view of the foregoing, it will be appreciated that certain exemplary embodiments are directed to a means of securely processing PIN Debit and Chip-and-PIN transactions at a terminal or other electronic device with which a user may interact and that does not have hardware-based security to hold encryption keys securely.

The terminal may be a conventional point of sale terminal, a mobile phone, tablet, personal computer, or the like. Although the terminal may have a touch-entry screen, magnetic stripe reader, NFC chip reader, etc., it may in some cases lack hardware-based security means for securely holding encryption keys. The terminals of certain exemplary embodiments also may be used in connection with jukebox devices, karaoke jukebox devices, portable entertainment systems, and/or the like. See, for example, U.S. application Ser. No. 13/833,173 filed Mar. 15, 2013; Ser. No. 13/138, 660 filed Mar. 5, 2012; and Ser. No. 12/929,466 filed Jan. 26, 2011, entire contents of each of which are hereby incorporated by reference herein.

A first system may be provided with a Hardware Security Module sufficiently secure to hold PIN code encryption keys and perform encryption of PIN. A second system may be provided with a Hardware Security Module sufficient to control the scrambling and descrambling of PIN entry on a terminal screen. A third system may be provided with a Hardware Security Module for decryption of encrypted card data (Card Data Hardware Security Module, "CDHSM"). The various systems may be physically separated from one another (e.g., at separate companies at behind different firewalls or the like), or they may be provided as different instances of a single broader system by a single provider location (e.g., behind separate firewalls managed by the single provider). A combined system may be used in still other exemplary embodiments. Other processing systems may be provided for manipulating data to and from the secure processing unit modules. Each system may include at least one processor, memory, non-transitory storage medium, network connection resources, and/or the like. (Similar processing resources also may be provided for the terminal.) It is noted that various systems may accept inputs from and provide outputs to a plurality of different terminals and/or the like.

Application software may be provided on the terminal for receiving PIN codes from a user interface (e.g., a touch screen, physical push buttons, etc.) and scrambling such data prior to transmission.

Device and associated application software on or connected to the terminal may be provided for reading card data via magnetic swipe, and card data may be immediately encrypted.

Alternatively, or in addition, device and associated application software on or connected to the terminal may be provided for chip-based acquisition of payment card data. Under current payment industry standards, the data provided by the chip for a payment card oftentimes is at least partially encrypted before transmission off of the chip in the card. Alternatively, or in addition, device and associated application software on or connected to the terminal may be provided for Near-Field Communication (NFC) based acquisition of payment card data. Under current payment industry standards, the data provided by the device holding the data, such as a chip on a card, or a secure element in a smart phone, oftentimes is at least partially encrypted before transmission off of the chip or secure element.

It is noted that the exemplary techniques contemplated herein may be used in connection with any form of debit-based payment where a PIN code or the like is required. It also is noted that the exemplary techniques contemplated herein may be used in connection with non debit based transactions such as, for example, credit card transactions where additional information (such as a CVV or other information) is required for confirmation purposes.

Although certain exemplary embodiments have been discussed in connection with PIN codes, it will be appreciated that such PIN codes need not necessarily be numeric. For example, alphanumeric codes may be used in certain exemplary embodiments. In other instances, confirmatory codes may be provided as biometric data (e.g., fingerprint, retinal, and/or other scans) may be substituted for or provided with more conventional alphanumeric PIN codes.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A system for securely processing payments, comprising:

first and second separate and/or physically separated computer systems, each of the first and second computer systems being configured to electronically communicate with an electronic device used in acquiring a user provided verification metric for a debit transaction, the transaction having an associated transaction identifier and the electronic device having an associated device identifier;

wherein the first computer system is configured to at least:
receive encrypted payment instrument information from the electronic device for the transaction,
decrypt the received encrypted payment instrument information,
electronically transmit to the second computer system the decrypted payment instrument information, the identifier of the electronic device, and the transaction identifier, and
electronically instruct the electronic device to request a scrambling key from the second computer system; and wherein the second computer system is configured to at least:
generate and transmit to the electronic device a scrambling key in response to a request being received at the second computer system from the electronic device,
receive a scrambled user provided verification metric code from the electronic device, the scrambled user provided verification metric code being scrambled at the electronic device using the generated scrambling key,
descramble and encrypt the received scrambled user provided verification metric code, and
electronically transmit to an electronic fund transfer network the payment instrument information received from the first computer system and the descrambled and encrypted user provided verification metric code to securely process the debit transaction.

2. The system of claim 1, wherein the first and second computer systems are separate from one another.

3. The system of claim 1, further comprising at least one firewall physically separating the first and second computer systems.

4. The system of claim 1, wherein payment instrument information is encrypted using a public/private key (PPK) encryption technique implemented in hardware of the electronic device.

5. The system of claim 1, wherein the encrypted payment instrument information is received at the first computer system from the electronic device over the Internet.

6. The system of claim 1, wherein the first computer system is further configured to determine that a payment instrument associated with the payment instrument information is a debit instrument for which a PIN code is required.

7. The system of claim 1, wherein the second computer system is further configured to send a message from the electronic fund transfer network to the electronic device using the second computer system, the message comprising a confirmation of acceptance of payment.

8. The system of claim 7, wherein the second computer system is further configured to send a message from the electronic fund transfer network to the electronic device using the second computer system by way of the first computer system.

9. The system of claim 1, wherein the first computer system is further configured to mask at least some of the payment instrument information.

10. The system of claim 9, wherein the first computer system is further configured to mask at least some of the payment instrument information by deleting at least some payment instrument information prior to its transmission to the second computer system.

11. The system of claim 1, wherein the electronic device is a payment terminal.

12. The system of claim 1, wherein the electronic device is a mobile phone.

13. The system of claim 1, wherein unencrypted payment instrument information and unencrypted user provided verification metric information is not stored together on any of the first computer system, second computer system, or electronic device.

14. The system of claim 1, wherein secure processing of the debit transaction via the first and second computer systems does not change an interchange rate.

15. A method for securely processing payments in connection with first and second separate and/or physically separated computer systems, each of the first and second computer systems including at least one respective computer processor and being configured to electronically communicate with an electronic device used in processing a PIN-related debit transaction, the transaction having an associated transaction identifier and the electronic device having an associated device identifier, the method comprising:
  at the first computer system:
    receiving encrypted payment instrument information from the electronic device for the transaction,
    decrypting the received encrypted payment instrument information,
    electronically transmitting to the second computer system the decrypted payment instrument information, the identifier of the electronic device, and the transaction identifier, and
    electronically instructing the electronic device to request a scrambling key from the second computer system; and
  at the second computer system:
    generating and transmit to the electronic device a scrambling key in response to a request being received at the second computer system from the electronic device,
    receiving a scrambled user provided verification metric code from the electronic device, the scrambled user provided verification metric code being scrambled at the electronic device using the generated scrambling key,
    descrambling and encrypt the received scrambled user provided verification metric code, and
    electronically transmitting to an electronic fund transfer network the payment instrument information received from the first computer system and the descrambled and encrypted user provided verification metric code to securely process the debit transaction.

16. The method of claim 15, wherein at least one firewall physically separates the first and second computer systems.

17. The method of claim 15, further comprising at the first computer system, receiving the encrypted payment instrument information from the electronic device over the Internet.

18. The method of claim 15, further comprising determining, at the first computer system, that a payment instrument associated with the payment instrument information is a debit instrument for which a PIN code is required.

19. The method of claim 15, further comprising relaying, through the second computer system, a message from the electronic fund transfer network to the electronic device using the second computer system, the message confirming acceptance of payment.

20. The method of claim 15, wherein unencrypted payment instrument information and unencrypted user provided verification metric information is not stored together on any of the first computer system, second computer system, or electronic device.

\* \* \* \* \*